United States Patent [19]

Shevlin

[11] 3,725,645
[45] Apr. 3, 1973

[54] CASSEROLE FOR STORING AND COOKING FOODSTUFFS

[75] Inventor: Thomas S. Shevlin, White Bear Lake, Mich.

[73] Assignee: Minnesota Mining and Manufacturing Company, St. Paul, Minn.

[22] Filed: Sept. 25, 1970

[21] Appl. No.: 75,711

Related U.S. Application Data

[62] Division of Ser. No. 781,157, Dec. 4, 1968, Pat. No. 3,608,627.

[52] U.S. Cl. ................ 219/521, 99/171, 99/328, 165/12, 219/387, 219/432, 219/441
[51] Int. Cl. ........................................... H05b 3/06
[58] Field of Search......219/387, 438, 439, 446, 441, 219/430, 432, 433, 435, 521; 99/171, 328; 165/2, 12

[56] References Cited

UNITED STATES PATENTS

| 3,385,952 | 5/1968 | Mix | 219/387 |
|---|---|---|---|
| 2,603,740 | 7/1952 | Del Buttero | 219/438 X |
| 1,946,220 | 2/1934 | Lotz | 219/440 |
| 2,863,037 | 12/1958 | Johnstone | 219/432 |
| 2,990,286 | 6/1961 | Clarke et al. | 99/171 |
| 3,038,058 | 6/1962 | Gorgon, Jr. | 219/521 X |
| 3,231,718 | 1/1966 | Vasile | 219/521 X |
| 3,353,476 | 11/1967 | Goodman et al. | 99/328 |
| 3,483,358 | 12/1969 | Eisler | 219/512 X |
| 3,519,798 | 7/1970 | Walther | 219/439 |
| 3,608,627 | 9/1971 | Shevlin | 165/2 |

Primary Examiner—Volodymyr Y. Mayewsky
Attorney—Kinney, Alexander, Sell, Steldt & Delahunt

[57] ABSTRACT

This invention is directed to a device and system for cooking foods from a refrigerated or a frozen state to an edible state directly in the refrigerated or frozen environment. One or more cooking receptacles or casseroles containing foodstuff are placed in a chamber maintained at desired refrigerated temperatures. A thermally insulated electric heating element either integrally formed with each receptacle or in direct contract therewith is connected to an electric circuit for the purpose of heating or cooking the food. The receptacles are thermally insulated and have a dish member on which the food is placed. In most systems it is preferred that the dish has a low heat capacity and high heat transfer characteristics so that substantially all of the heat produced by the element is transferred through the dish directly to the food. The heating elements if the casseroles are controlled by the circuit so that each casserole or a group of casseroles may be selectively energized to cook or heat the food while the chamber remains at refrigerated or freezing temperature and the remaining non energized casseroles are retained in frozen or refrigerated condition.

8 Claims, 5 Drawing Figures

PATENTED APR 3 1973 3,725,645

INVENTOR.
THOMAS S. SHEVLIN
BY Kinney, Alexander
Sell, Steldt & DeLaHunt
ATTORNEYS

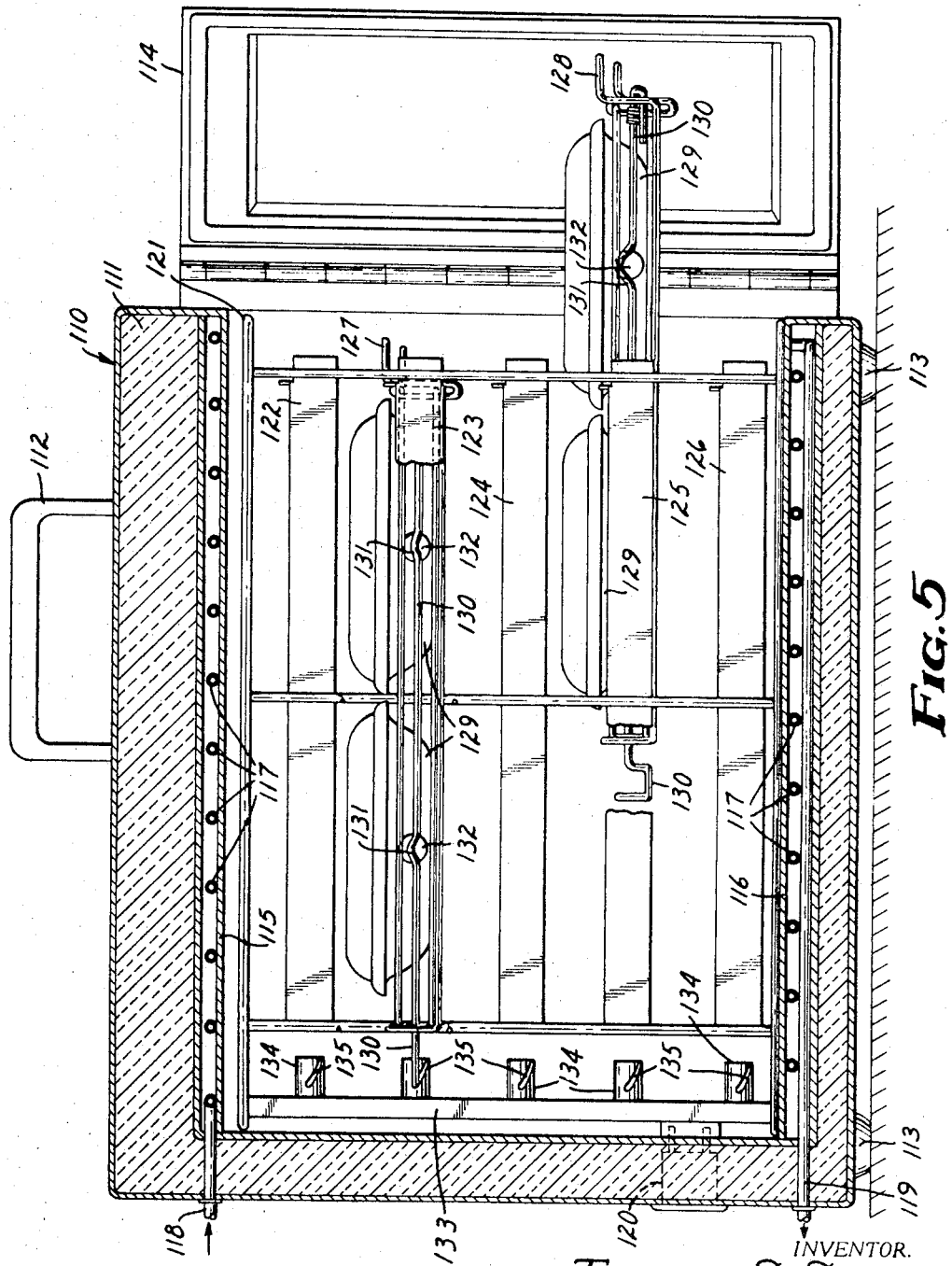

3,725,645

CASSEROLE FOR STORING AND COOKING FOODSTUFFS

This is a division of Application Ser. No. 781,157, filed Dec. 4, 1968 (now matured into U.S. Pat. No. 3,608,627).

This invention relates to a combination refrigeration and cooking device and a system for storing and subsequently cooking foods and the like in a freezer, refrigerator or similar low temperature chamber or room. The system is adaptable for operation in all temperature ranges generally utilized for either refrigerating (e.g., chilling) or freezing foodstuffs including low temperature cryogenical food freezing, food preservation and storage. Fresh foods, precooked or pretreated foods, prefrozen foods or reconstituted foods may be placed in the system for refrigerated storage or freezing and subsequently cooked therein. The system eliminates the necessity of first placing food in a refrigerator, freezer, etc. for storage to prevent spoilage and subsequently removing it from the freezer and placing it in an oven or stove for cooking. Refrigeration, storage and cooking are carried out in the same environment and device.

The device consists of a freezer, refrigerator or other similar refrigeration mechanism of desired size and capacity. One or several cooking or heating dishes, receptacles or casseroles are prepacked with desired sized food portions and placed in and supported on an array of shelves within the freezer. Each casserole is integrally formed with or in direct interfacial contact with a heating element. A dish portion of the casserole containing the food is made of light metal of low heat capacity so that substantially all of the thermal energy produced by the heating element during cooking passes through the metal directly into the food. Heating or cooking is rapid, being in the nature of 10–30 minutes. The casserole, its associated heating element, and mating cover member are preferably thermally insulated to prevent any significant passage of heat into adjacent ambient air.

The heating element of each casserole is interconnected to an electric circuit for controlling energization of the element so that one or several casseroles can be selectively energized while the remaining non energized casseroles are retained in chilled or frozen condition. The high thermal conductivity from the electric heating element to the food and the low thermal conductivity from the interior of the casserole to the adjacent ambient air allows the food to be cooked without a significant disturbance to the refrigerated environment produced by the freezer and the adjacent casseroles that remain in frozen state. The device can be adapted to operate in available refrigerating units with standard refrigeration capacities or specially designed units can be easily and economically manufactured.

The device and system thus combines a freezing-refrigerated unit with a cooking unit. Such combination offers many advantages.

Food in large or individual meal sized portions can be stored and cooked in the same unit eliminating the need for manually shifting from refrigerated storage to cooking environments. Food can be cooked directly from its stored-frozen state to edible state without burdensome precooking operations. Large units can be used by caterers and restaurateurs to store a great number of casseroles and selectively cook individual or small numbers of meals at desired times by simply operating a control panel to heat the selected casseroles and removing the casseroles after the food has been cooked. Additionally the system can be easily automated for automatic vending operations. A prospective purchaser (after activating a vending machine with proper coins, etc.) can, by operating a control panel interconnected with suitable circuitry, select and heat a casserole containing the desired meal. The short cooking time required makes the device highly adaptable for this purpose.

The device is also adaptable for domestic use. A refrigeration and cooking unit can be combined into one unit to save space. The electric circuit may be automatically controlled so that selected casseroles will be heated for the desired cooking period. Additionally the device may be pre-programmed so that the meal may be prepared or cooked for serving at a subsequent time. Frozen foods, fresh foods, reconstituted foods, or precooked foods may be placed in the casseroles for retention in a frozen state until it is desired to energize the desired casserole.

The device may also be constructed in the form of light portable or semi-portable units for storing and cooking food in aircraft, railway dining cars, buses, vacation homes, etc. Its light weight makes it especially adaptable as a storage and cooking device for aircraft meals. A plurality of individual meal sized casseroles packed with prefrozen, fresh, reconstituted or precooked foods can be stored in the aircraft and the meals selectively heated during flight. Casseroles not energized retain their contents in frozen state until subsequently selectively energized for cooking.

The device and system thus efficiently and economically handles the problems of food storage and preparation for consumption in one unit. After initially packing the food in the casseroles no additional manipulation is necessary. Selected casseroles are cooked in their initial position in the unit. They are not handled until the food contained therein has been cooked and ready for removal and consumption.

DESCRIPTION OF THE DRAWINGS

Understanding of the invention will be facilitated by referring to the accompanying drawings in which like numerals refer to like parts in the several views and in which.

DETAILED DESCRIPTION

This invention is based on the concept of placing one or more cooking or heating dishes or casseroles containing food or other material with similar thermal characteristics into a freezing or chilling chamber. Each casserole has an electric heating element associated therewith which is connected to an electric circuit controlled by suitable switching and/or timing means so that the elements of all casseroles can be energized simultaneously or selectively energized leaving the unenergized casseroles and their contents to remain in frozen state. The circuit is adapted to constantly energize the heating elements or apply the electrical energy in repetitive intermittent pulses of desired time intervals, e.g., 20 seconds "on" and 30 seconds "off". Each casserole has a cover and an associated heating element which forms a complete thermally insulated unit. The thermally insulated unit reduces the heat loss of internally produced heat so that there is no significant loss of heat to thermally affect adjacent casseroles that may be retained in frozen state. Additionally, a dish member of the casserole per se is made of materials with low heat capacity so that there is an efficient transfer of heat produced by the heating element directly into the food.

Figure 1:
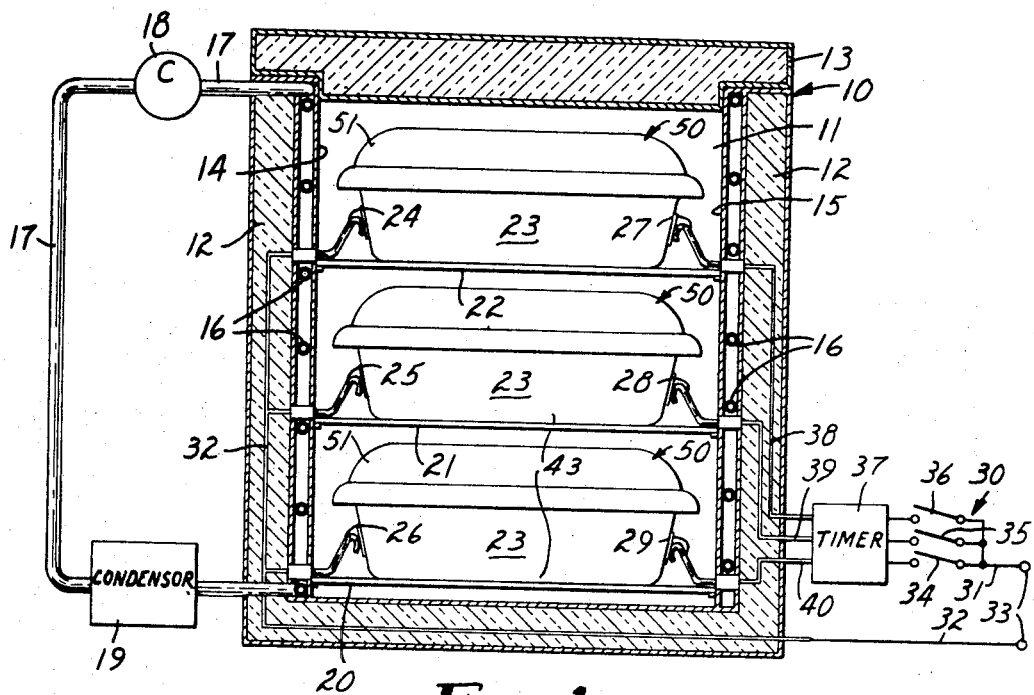
FIG. 1 is a sectional view of an exemplary combination freezing and cooking unit showing individual casseroles mounted on shelves, the means for electrically energizing the casseroles and freezing the chamber schematically shown.

FIG. 1 schematically shows an exemplary freezing chamber generally designated 10 which forms a cavity 11 insulated by thermal insulation 12 and which has a removable cover 13 or a removable front wall not shown in the drawings. If desired, the chamber can be fitted with inner walls 14 and 15 spaced from the interior of the chamber to provide an interspace for mounting freezing coils 16 which are convoluted around the periphery of cavity 11. A suitable refrigerant such as fluorinated hydrocarbons, ammonia or carbon dioxide is delivered to coils 16 by delivery tube 17. The refrigerant is circulated by compressor 18 and heat is removed by means of condensor 19. The refrigeration unit is shown schematically for simplicity, it being understood that tube 17, compressor 18 and condensor 19 can all be integrally formed with chamber 10 or separated as shown, both systems well known in the art. Additionally, a thermostat in chamber 10 may be set to keep air temperatures in the cavity in refrigerated or chilled ranges, e.g., 34°–40° F. or in freezing ranges, e.g., −20°F. to 32°F. If desired, liquid nitrogen or other cryogenically cooled gases can be intermittently introduced directly into chamber 10. Also suitably cooled brine can be circulated by well known means within the chamber.

An array of flat shelf members 20-22, either completely removable or mounted for forward sliding movement, each support one or more cooking or heating casseroles generally designated 23 each of the casseroles packed with food. The casseroles may be of any desired size, e.g., of a size to hold individual meal sized quantities of different foods or of larger sized to cook multiple meals in each casserole. In the embodiment of FIG. 1 each casserole has a heating element integrally associated therewith explained in greater detail with reference to FIG. 2. Each heating element in turn is contacted by removable or hinged biased contact members 24-29 each contiguously formed with and insulated from shelf members 20-22. Contacts 24-29 are interconnected to a circuit generally designated 30 which has leads 31 and 32 extending from a power source 33. Lead 32 is interconnected directly to contacts 24-26 and lead 31 connected to switches 34-36. The switches in turn are connected to a timer 37 which has wires 38-40 extending therefrom which lead respectively to contacts 27-29. As can readily be understood by viewing FIG. 1, the heating elements of casseroles 23 on shelves 20, 21 and 22 can be energized by closing the appropriate switch, e.g., switch 36 closed to energize the heating element of the casserole on shelf member 22; switch 35 closed to energize the element of the casserole on shelf member 21, etc. Switches 34-36 may be closed simultaneously by suitable means (e.g., manual, mechanical or electrical) to energize the heating elements of all casseroles or selectively closed to energize the element of a selected casserole or casseroles.

In the embodiment schematically shown, circuit 30 employs timer 37 to control and actuate switches 34-36 for energizing the selected casseroles. The timer may be used to energize the heating element of the selected casseroles constantly throughout a predetermined cooking period by closing the desired switch or switches 34-36. If desired, the heating element per se may also be controlled by a thermostat suitably incorporated with the element so that cooking temperatures will be retained within desired ranges. It is preferred, however, to suitably integrate timer 37 with switches 34-36 so that they operate as a single controlling unit to pulse energize the heating elements in discrete pre set on and off intervals (e.g., 20 seconds on, 30 seconds off, etc.) throughout the cooking period. When the electrical energy and resultant thermal energy are applied in pulsations, the heat is applied to the food in spaced intervals of time to reduce the possibility of scorching the food, i.e., allowing the food during the off intervals to absorb heat induced during the on intervals.

Figure 2:
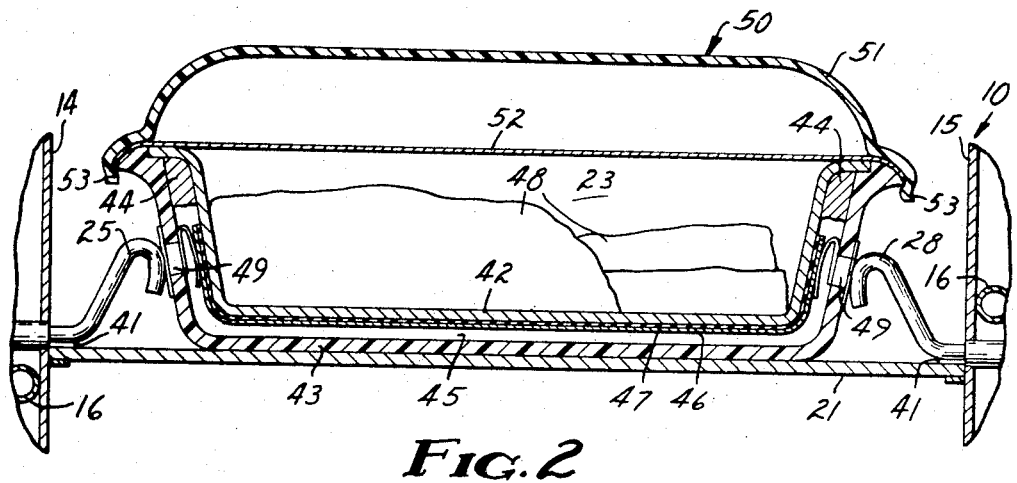
FIG. 2 is a sectional view, enlarged for detail, of one of the casseroles of FIG. 1 mounted on one of the shelves and in contact with electrical contacts.

FIG. 2 shows a detailed view of the construction of the casseroles 23 mounted on a shelf such as shelf member 21 of FIG. 1 and interconnected between biased contacts 25 and 28. The contacts 25 and 28 are shown suitably insulated from shelf member 21 by insulating layer 41 integrally formed with each contact.

Casserole 23 has a metal dish shaped member 42, the upper peripheral edges thereof terminating in a lip like contour which mates with a similar lip member on the periphery of a shoe or base 43 also dish shaped and preferably molded from suitable polymeric material such as polysulfone and having adequate thermal insulating characteristics. A gasket or adhesive sealer 44 adhered to the upper peripheral edges of dish 42 and base 43 adjacent their common juncture seals and adheres dish 42 to base 43 so that the former is suspended within base 43 and in spaced relation thereto to form a thermally insulating air void 45 between the dish and base. The lower portion or bottom wall of dish 42 interfaced with base 43 has an electric heating element 46 integrally formed with the dish and insulated therefrom by a suitable dielectric layer 47 bonded to the dish. Element 46 may be a wire resistor although it is preferred to use a thick film resistor bonded to the dielectric layer 47 so that heat produced by the resistor will be efficiently transferred up through dish 42 to the food contained thereon such as food portions 48. It is preferred that dish 42 has a low heat capacity so that substantially all the heat produced by element 46 will pass through the dish. A dish comprising 20 gauge enamel coated mild steel having a weight of 1.5 pounds per square foot and a heat capacity of 0.520 calories per square inch per degree centigrade was found to operate highly satisfactorily. Air void 45 provides a thermally insulating air space below element 46 to prevent excessive heat loss from the bottom of the casserole. If desired the void 45 may be filled with insulating material such as fiberglass.

In connection with the thermal characteristics of the casserole it is to be understood that in the interest of efficiency it is preferred that most systems utilize a casserole that rapidly and efficiently transfers heat directly into the food and is thermally insulated to prevent any heat in the ambient air from entering unheated casseroles. However, large or complex refrigerated systems will operate effectively even though the casserole and its associated heating element operate under relatively inefficient thermal conditions. For example, a chamber with partial partitions and/or means for circulating cooled air or with high refrigeration capacity will adequately prevent undue heating of adjacent casseroles kept in a frozen state even though the thermal characteristics of the casseroles are relatively poor.

Heating element 46 extends up both sides of dish 42 so that each end of the element terminates in contact with a pair of resilient metallic contact discs 49 which extend through base 43 to make direct contact with contacts 25 and 28 for allowing current to pass from the contacts to the heating element 46.

To complete thermal insulation, casserole 23 has a thermally insulated cover generally designated 50 form fitted to the top thereof. The cover may be formed in any configuration, but a preferable cover consists of a raised rigid molded film 51 of polystyrene spaced above a planar layer of aluminum foil 52 disposed transversely across the top of the dish 42 and base 43. The space between the foil and film serves as a thermally insulating air void and the under surface of the foil reflects heat back into dish 42. Film 51 has a series of integral detents 53 formed on the peripheral edges of the film which resiliently engage the lips on the upper edges of base 43 to secure the cover.

All parts of casserole 23 and its molded polystyrene cover 51 are thus of durable materials so that after the ultimate consumer removes foil 52 and consumes the food in the casserole, the casserole may be collected and subjected to a cleaning and/or sterilizing process and repacked with food for further repeated storage, cooking, and serving.

Figure 3:
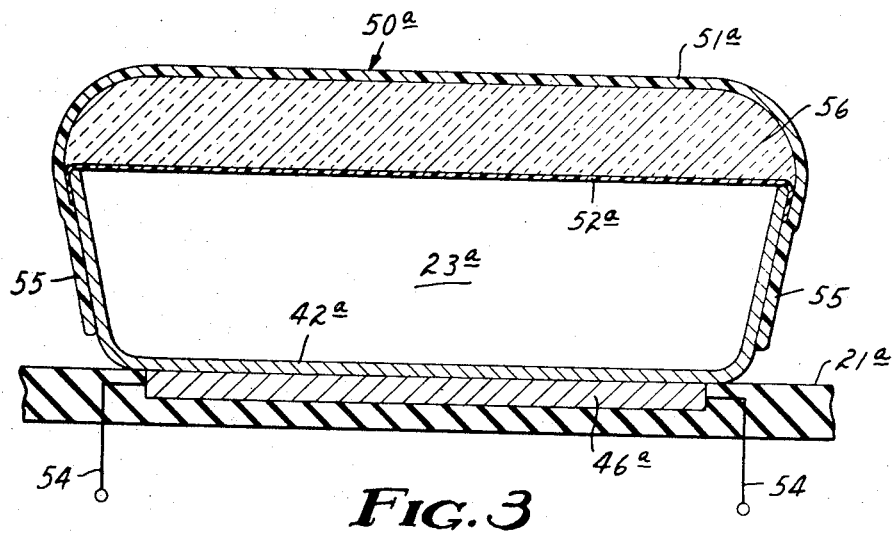
FIG. 3 is a sectional view of a modified form of casserole mounted on a segment of shelf with an electrical resistor incorporated in the shelf.

FIG. 3 shows a modified form of casserole and heating element. In this modification the casserole 23a consists of a metal dish 42a which has substantially the same heat transfer characteristics as dish 42.

Casserole 23a is disposed directly over a shelf 21a made of suitable electrically and thermally insulated material and which has an electric heating element 46a, such as a wire resistor or film resistor, embedded in the shelf and connected to an electric power source by leads 54. The upper surface of element 46a is suitably insulated (not shown in the drawings) so that it supports and is in direct contact with the bottom wall of dish 42a, the latter being oriented so that it extends beyond each end of element 46a. The direct interfacial contact between the dish and element allows heat to pass directly into the dish. Insulated shelf member 21a reduces the flow of heat below the shelf and from the bottom of the casserole.

A cover generally designated 50a has flexible truncated peripheral edges 55 extending down the sides of the casserole to provide a substantially air tight fit therewith and is formed from a raised polystyrene film member 51a shaped similar to cover 50 of the FIG. 2 embodiment. A flat sheet 52a of laminated polyester and polyethylene film such as the type manufactured and sold by Minnesota Mining and Manufacturing Company under the trademark "SCOTCHPAK" is spaced from film 51a and extends transversely over the top of the dish 42a similar to foil 52. The space between film 51a and sheet 52a is filled with a suitable insulating material 56 such as fiberglass.

It is understood that cover member 50 used in conjunction with casserole 23 may be constructed similar to cover 50a incorporated with casserole 23a and vice versa. Additionally, other materials are suitable for insulating the cover member of the casseroles such as a planar layer of laminated polyester and polyethelene film stretched across the top of the dish or similarly stretching single or multiple layers of aluminum foil with air spaces between the multiple layers.

In order for the system to operate most efficiently when allowing some of the casseroles to be selectively heated while the non selected casseroles remain in a frozen state, each casserole should have a substantially low heat loss during the time it is energized for cooking. Heat loss should be kept at sufficiently low levels so that the capacity of the freezing or refrigerating unit will not be overtaxed and the temperature of adjacent casseroles in frozen state will not be adversely affected.

Table I shows that casseroles constructed substantially in accordance with the embodiment of FIG. 2 have significantly low levels of heat loss. To determine heat loss for the examples of Table I an equilibrated heat level method was used. A series of 5 × 7 inch casseroles in the form and construction of casserole 23 were filled with 5 to 8 ounces of water and heated to the temperature levels shown in the table. 5 × 7 inch casseroles were used as they are of a size sufficient to hold average individual meal sized portions of food. The temperature levels of Table I were selected as they represent average maximum temperature levels utilized to cook a variety of foods in the casseroles under preferred cooking procedures, i.e., supplying electrical energy to the casseroles' heating elements in pulsations or on and off intervals for the desired cooking period.

After the water was heated to the stated temperature levels, the temperature was equilibrated by pulsing a sufficient amount of electrical energy to the heating elements to constantly maintain the stated levels. In the examples shown in Table I, pulses in the range of about 5 seconds on and 30 seconds off (i.e., one pulsation per 35 seconds at voltage ranges of 85–110 volts and 1.9–2.5 amps.) were found adequate to equilibrate the heat flow at the levels shown. The amount of thermal energy pulsed into the casserole to maintain a constant temperature thus establishing the equilibrium between the casserole (together with its contents) and the ambient air was therefore exactly equal to the casserole's heat loss which is shown in Table I and expressed in BTU lost per minute.

Five of the casseroles used in the equilibrating procedure incorporated covers composed of different materials as described in the table. A sixth casserole (casserole No. 6 in Table I) utilized a cover identical to the cover incorporated with casserole No. 1 and additionally a fiberglass insulating material was packed in a void (i.e., void 45 of FIG. 2) in the bottom of the casserole. As seen in Table I, casserole No. 6 had the lowest heat loss; however, the rate of heat loss for the other casseroles of Table I using different covers also exhibited significantly low rates of heat loss.

TABLE I

| Casserole Number | Cover | Equilibrated Temperature Level in °F. | Heat Input Required to Maintain Equilibration, i.e., Heat Loss |
|---|---|---|---|
| 1 | A layer of 5 mil laminated polyester-polyethelene spaced from a 4 mil rigid polystyrene cover. Void between layers filled with fiberglass. Similar to cover 50a, FIG. 3. | 180 | 1.33 BTU/min. |
| 2 | One 5 mil layer of laminated polyester-polyethelene. | 165 | 2.37 BTU/min. |
| 3 | One Layer 1.5 mil aluminum foil spaced from a 4 mil rigid polystyrene cover. Air void between layer and film. Similar to cover 50, FIG. 2. | 176 | 1.82 BTU/min. |
| 4 | One layer of 1.5 mil aluminum foil. | 173 | 2.18 BTU/min. |
| 5 | Three layers of 1.5 mil aluminum foil in substantial contact with each other. | 175 | 2.18 BTU/min. |
| 6 | A layer of 5 mil laminated polyester-polyethylene spaced from a 4 mil rigid polystyrene cover. Void between layers filled with fiberglass. Similar to cover 50a of FIG. 3. Additionally fiberglass insulation packed in void at bottom of casserole. | 172 | 1.15 BTU/min. |

Table II shows the percentage of heat loss for each of the six casseroles of Table I. Heat loss percentage was calculated on the basis of total heat input required for heating a known quantity of water (10 ounces) compared with the heat input (heat loss) required to maintain the temperature equilibration levels of Table I. Total heat input (column 6, Table II) is the sum of the heat retained by the contents of the casserole, the casserole per se (which, because of its high thermal conductivity, is negligible) plus the amount of heat lost from the casserole and its contents during the cooking or heating period. In the examples of Table II the cooking period was 20 minutes.

The input of heat retained by the contents of the casserole (shown in column two of the table) is the amount of heat in BTU required to heat 10 ounces of water (which has essentially the same thermal characteristics as that of most foods) from 0°F. to 180°F. The latter temperature is the highest shown for any of the examples of Table I and therefore represents the maximum heat input to be required in the examples and is thus used for all calculations in Table II, column two. The calculation for column 2 is the sum of three readily ascertainable quantities, i.e., the amount of heat required to raise 10 ounces of ice from 0°F. to 32°F; the heat required to melt the ice and the heat required to raise the temperature of 10 ounces of water from 32°F. to 180°F. The total amounts to approximately 200 BTU.

The average rate of heat loss during the total heating period (column 4, table II) is essentially one half the rate of heat loss at the equilibration temperatures shown in Table I, since at the start of heating (0°F.) substantially no heat is lost. Total heat loss during the 20 minute heating period (column five, Table II) is therefore the product of the average rate of heat loss per minute and the total heating period. The percentage of heat loss (the total heat loss compared with total heat input) is shown in column seven.

TABLE II

| Casserole | Amount of heat required to heat 10 cc. of water from 0° F. to 180° F. in B.t.u. | Rate of heat loss at equilibrated temperatures of Table 1 in B.t.u. min. | Average rate of heat loss during 20 minute heating or cooking period in B.t.u. minute (½ value of Colum 3) | Total heat 20 minute heating period in B.t.u. | Total heat input (heat required to heat water plus total heat loss) | Percent of heat loss |
|---|---|---|---|---|---|---|
| 1 | 200 | 1.33 | 0.67 | 16.30 | 213.3 | —6.2 |
| 2 | 200 | 2.37 | 1.18 | 23.60 | 223.2 | 10.6 |
| 3 | 200 | 1.82 | 0.91 | 18.2 | 218.2 | —8.3 |
| 4 | 200 | 2.18 | 1.09 | 21.8 | 221.8 | 9.83 |
| 5 | 200 | 2.18 | 1.09 | 21.8 | 221.8 | 9.83 |
| 6 | 200 | 1.15 | 0.58 | 11.5 | 211.5 | 5.45 |

The stated heat loss values of Table II show a range of 5.45 to 10.6 percent. The percent of heat loss within these ranges does not produce significantly high thermal loads which would overtax or decrease the efficiency of standard refrigeration units. Casseroles larger or smaller than the 5 × 7 inch casseroles used in the examples of Table I would, of course, have essentially the same heat loss on a per unit area basis. Thus a difference in size of the casseroles constructed in accordance with the embodiment of FIG. 2 is not a significant factor with respect to heat loss.

Figure 4:
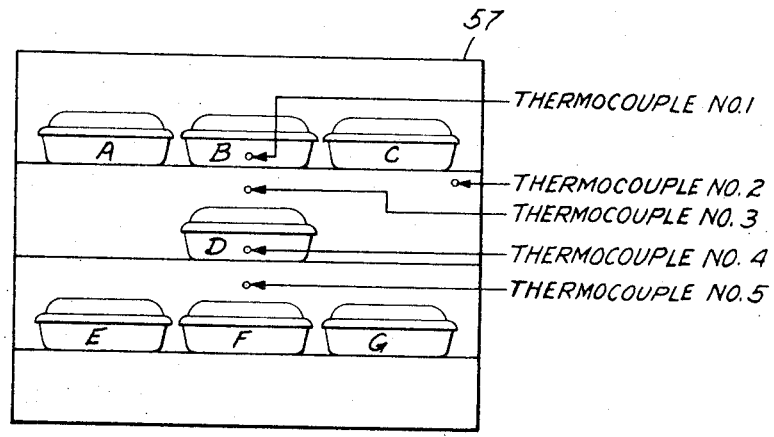
FIG. 4 is a schematic diagram showing the location of thermocouples used in determining the temperature of individual casseroles and the ambient air adjacent the casseroles; and, FIG. 5 is a side view of a light weight combination freezing and cooking unit suitable for storing and preparing meals in aircraft, the side of the unit broken away to show the interior of the structure.

FIG. 4 schematically shows an arrangement of casseroles (similar in construction to casserole 23 of FIG. 2) used in determining the amount of heat loss to ambient air adjacent heated casseroles and the effects of heat loss on the temperature inside adjacent unheated casseroles. A series of 5 × 7 inch casseroles A – C were packed with 10 ounces of frozen food. The casseroles were then arranged as schematically shown on a frame 57. Thermocouples 1–5 schematically represented by small circles at the positions indicated by the arrows of FIG. 4 were suitably connected to register any changes in temperature at their specific locations. The entire arrangement was placed in a freezer, such as chamber 10, at a temperature of about —15°F. and the heating elements of each casserole suitably connected to an electric power source (the element, circuit and power source not shown in FIG. 4.). In this position selected casseroles filled with food were energized and any change of temperature adjacent the thermocouples 1–5 was registered.

Table III below shows temperature variations registered by thermocouples 2–5 (thermocouple 1 not utilized in this example) when casserole D was energized by pulsing 110 volts of current to its heating element (30 ohm resistance) in 20 second on and 30 second off intervals for a total cooking period of 20 minutes.

TABLE III

| Minutes of cooking | Registered temperature of thermocouples 2-5 in degrees fahrenheit | | | |
|---|---|---|---|---|
| | 2 | 3 | 4 | 5 |
| 0 | −3 | +7 | +15 | +5 |
| 2 | −3 | +8 | +17 | +11 |
| 4 | −3 | +12 | +54 | +14 |
| 6 | −5 | +17 | +93 | +17 |
| 8 | −5 | +26 | +104 | +17 |
| 10 | −7 | +37 | +120 | +17 |
| 12 | −7 | +51 | +140 | +19 |
| 14 | −7 | +68 | +170 | +20 |
| 16 | −4 | +82 | +192 | +20 |
| 18 | −3 | +91 | +202 | +22 |
| 20 | 0 | +95 | +202 | +21 |

Referring to FIG. 4 and Table III, it is to be noted that thermocouple 3 located in the air space above the heated casserole D and below unheated casserole B registered an ambient air temperature high of 95°F. However, thermocouple 5 located in the air space below the heated casserole D remained at temperature levels below freezing. Additionally, thermocouple 2 located above and laterally from casserole D remained at temperatures well below freezing. Thermocouple 4 represents the temperature inside heated casserole D.

Table IV, below, shows temperature variations registered by thermocouples 1–5 when casseroles A–C and E–G were energized by pulsing 110 volts of current to the heating element of each casserole (30 ohm resistance) in 20 second on and 30 second off intervals for a total cooking period of 20 minutes. Casserole D was not energized.

TABLE IV

| Minutes of cooking | Registered temperature of thermocouples 1-5 in degrees fahrenheit | | | | |
|---|---|---|---|---|---|
| | 1 | 2 | 3 | 4 | 5 |
| 0 | +10 | −12 | 0 | +12 | −2 |
| 2 | +12 | −10 | +3 | +12 | 0 |
| 4 | +17 | −12 | +4 | +11 | +3 |
| 6 | +20 | −9 | +8 | +11 | +6 |
| 8 | +29 | −9 | +16 | +12 | +13 |
| 10 | +43 | −7 | +21 | +13 | +19 |
| 12 | +104 | −7 | +32 | +12 | +37 |
| 14 | +160 | −6 | +50 | +13 | +56 |
| 16 | +184 | −4 | +70 | +14 | +70 |
| 18 | +191 | −3 | +78 | +18 | +76 |
| 20 | +197 | −2 | +80 | +13 | +78 |

Referring now to FIG. 4 and Table IV it is seen that thermocouple 3 above unheated casserole D registered an ambient air temperature high of 80°F. and thermocouple 5 above heated casserole F registered an ambient air temperature high of 78°F. However, thermocouple 4 located inside unheated casserole D remained at temperature levels below freezing indicating that the thermal insulation of the casseroles (such as casserole 23 of FIG. 2) not only serves to keep internally generated heat within the casserole but also prevents entry of heat generated by adjacent casseroles that may escape into the ambient air. The registration of thermocouple 2 in both Table III and IV shows that heat loss from the casseroles does not affect the ambient air in areas located laterally from or well above the heated casseroles. Both tables indicate that the primary heat loss apparently occurs through the covers of the casseroles and extends directly upward. As indicated by the registrations of thermocouple 4 in the unheated casserole (Table IV), heat loss to ambient air is not a significant factor. The thermal insulation of unheated casseroles suitably insulates the casserole from any increase in the temperature of the adjacent ambient air that takes place during cooking.

However, if it is desired to further reduce heat loss from the casserole, a cover comprising two reflective layers separated by an interspace in which a vacuum is formed can be fashioned. Additionally the bottom of the casserole can be similarly constructed by removing the air from void 45 and (if desired) suitably bonding a reflective coating over the lower surface of resistor 46 and the inner surface of base 43 to form a second thermally insulating vacuum. Alternately the thermally insulating capacity of void 25 can be improved by simply increasing the air space between dish 42 and base 43, and, if desired, packing the increased space with insulating material such as fiberglass.

Other suitable means for substantially eliminating heat loss or its effects can also be used. For example, the air pressure in the interior of the refrigerated chamber can be slightly lowered in order to reduce the movement of heat by convection or the refrigeration capacity of the freezing unit can be increased. Another satisfactory procedure is to cryogenically freeze the food to extremely low temperatures by liquid nitrogen when the food is originally packed in the casseroles or by periodically introducing the liquid nitrogen into the freezing chamber to constantly keep the chamber at low temperatures while the casseroles are stored and cooked therein.

In connection with the latter procedure, a number of casseroles constructed substantially in accordance with the embodiment of FIG. 2 were placed in a light weight freezing and cooking device similar to shell 110 shown and described below with reference to FIG. 5. The shell was cooled by intermittently introducing liquid nitrogen into its interior throughout a preselected cooking period during which selected casseroles were heated. Determinations of temperature variations in the ambient air and inside heated and unheated casseroles during the cooking period were made by using and orienting a series of thermocouples within the shell in a manner similar to the procedure described in conjunction with FIG. 4. While the overall patterns of temperature variations recorded by the thermocouples were similar to the patterns shown in Tables III and IV, the temperature levels per se in both the unheated casseroles and ambient air within the liquid nitrogen cooled shell were considerably below the temperature levels shown in the tables. The liquid nitrogen, being a cryogenically liquified gas, maintained the temperature of the ambient air and unheated casseroles at an overall average temperature of about 0°F. as compared with the somewhat higher temperatures of Tables III and IV.

FIG. 5 shows another embodiment of this invention which comprises a light weight freezing and cooking device especially adapted for use in aircraft for storing food and for in flight cooking of the food in individual meal sized casseroles. The food is served in the casseroles per se after cooking is completed. This embodiment comprises a freezing chamber or shell generally designated 110 having inner and outer walls and the interspace therebetween filled with suitable thermal insulation 111. Shell 110 has a handle 112, adjustable supports 113 and a hinged thermally insulated door 114. An upper panel 115 and lower panel 116 (similar side panels are not shown in the drawings) are suitably affixed in spaced relation to the inner walls of shell 110 and a series of convoluted freezing coils 117 are arranged around the periphery of the interior of the shell in the space between panels 115, 116 and the inner walls.

A suitable refrigerant to constantly maintain the interior of shell 110 at freezing or refrigerated temperatures is circulated through coils 117 by means of a compressor (not shown in the drawings) connected to intake tube 118. A discharge tube 119 is connected to a condensor (not shown) which removes heat carried by the refrigerant in the coils by methods well known in the art. As in the case of chamber 10 of FIG. 1, the compressor and condensor can be contiguously formed with shell 110. Alternately, this type of freezing unit can be eliminated and means substituted to intermittently introduce liquid nitrogen directly into the interior of shell 11 to keep the temperature of the interior at extremely low levels.

An electric connector 120 interconnects an electrical system in shell 110 with a power source. Preferably, a timing-switching system such as the timer and switching system described with reference to FIG. 1 is suitably interconnected between the power source and connector 120 and adapted to selectively pulse energize the heating elements of casseroles placed in the shell in on and off intervals (e.g., 20 seconds on and 30 seconds off) during the cooking period. The timer may also be adapted to maintain the casseroles at equilibrated temperatures by applying occasional pulses of electric energy (e.g., 2-5 seconds on, 30 seconds off) after cooking is completed to hold the casseroles at edible temperatures until served. It is understood that a suitable timing-switching device or system may be mounted contiguously with shell 110.

A removable rack 121 is adapted to slide in and out of shell 110 and has a series of U shaped channel supporting members 122-126 which slidably engage and support a series of shelves or pan members, only two shelves or pan members 127 and 128 shown in the drawings. The pan members support a series of individual meal sized casseroles 129 which in construction are identical to the casserole unit 23 (including heating element 46 and the cover 50) shown and described with reference to FIG. 2. Each pan member 127 and 128 has rotatable electrical conducting rods 130 with spaced arcuate sections 131 which, when the rod is rotated, contacts a contact disc 132 on the side of each casserole 129. Disc 132 interconnects the integral heating element of the casserole with conducting rod 130 and is constructed the same as disc 49 of FIG. 2. A bus bar 133 which suitably connects with connector 120 when rack 121 is fully inserted in shell 110 is formed at the inner end of the rack. A series of contact studs 134 are mounted on bar 133. Each stud has a helical aperture 135 to receive the inner ends of rods 130 when rack 121 is inserted in shell 110. Apertures 135 of the studs serve to rotate the rods to bring the arcuate sections 131 in contact with discs 132.

In operation individual meal sized portions of fresh, pre-cooked, reconstituted or pre-frozen food are packed in casseroles 129 which are then placed in shelves or pans 127, 128. The pans slide into position within rack 121 and rods 130 interconnect contact discs 132 with contact studs 134. The rack is then placed in shell 110 which is maintained at suitable refrigerated temperatures by the refrigerant in coils 117 or by dry ice or liquid nitrogen. A suitable timing and switching system is then operated to selectively energize the heating elements of selected casseroles 129 so that some of the casseroles are heated and others remain in frozen state until energized at a subsequent time.

The specific embodiments herein are given by way of example and the invention is limited only by the terms of the following claims.

What is claimed is:

1. A casserole for storing food and for cooking food comprising: a thick film resistor adaptable for use with an electrical source applying 85 to 110 volts of electric current and a timer electrically connected to the electrical source for applying the electric current to said film resistor in discrete on intervals, each followed by a discrete off interval during which no electrical current is applied; a heat conductive dish member for supporting food, the under surfaces of the bottom portion of the dish integrally formed with said thick film resistor, the dish having a low heat capacity so that a substantial portion of heat generated by said resistor during each of said on intervals is transferred through said dish into said food during said on intervals, the food absorbing heat transferred in the on intervals during said off intervals; a thermally insulated base member and cover surrounding said dish and resistor to thermally insulate same so that the percentage of heat loss from said casserole when the casserole is heated by the resistor is in the range of 1.15 to 2.3 BTU per minute; and electrical connectors in said insulated base member connecting said film resistor to said timer.

2. The casserole of claim 1 in which each of said discrete on intervals are 20 seconds in duration and each of said discrete off intervals are 30 seconds in duration.

3. A re-usable casserole for storing food and for cooking food in defined cooking periods comprising: a thermally insulated base member and cover member over the base member; a heat conductive steel dish to support food, the dish having lip means along its periphery to contact said base to support said dish by suspending it within said base and under said cover, the dish having a dielectric layer integrally formed with the under surface of the bottom of the dish, a film resistor integrally bonded with the dielectric layer and adapted to be connected to a source of electrical energy in the range of 85 to 110 volts, the resistor having a resistance of about 30 ohms for producing heat when energized by said electrical energy during said cooking periods, the dish having a weight of about 1.5 pounds per square foot and a heat capacity of about 0.5 calories per square inch per degree Centigrade to pass substantially all of the heat generated by the resistor through the dish into the food supported by the dish, the thermally insulated base and cover surrounding the dish and the heat capacity of the dish maintaining the percentage of heat loss from the casserole during said cooking period in the range of about 5 to 10 per cent; and electrical connectors in said insulated base member connecting said film resistor to said source of electrical energy.

4. The casserole of claim 3 in which said dish is suspended within said base in spaced relation from the bottom portion of the base and is sealed to said base by adhesive sealing means extending along said lip means of said dish.

5. The casserole of claim 3 in which said cover member comprises layers of polymeric material with a void therebetween.

6. The cover member of claim 5 in which the void between said layers of polymeric material is filled with thermally insulating material.

7. The casserole of claim 3 in which said cover member comprises a layer of polymeric material spaced from a layer of aluminum foil.

8. A re-usable casserole for storing food and for cooking food after storage in a defined cooking period in the range of 10 to 20 minutes comprising: a thick film resistor adapted to be connected to a source of electrical energy in the range of 85 to 110 volts and a timer electrically connected to the source of electrical energy for applying the electrical current to said film resistor, the electrical energy when supplied to said film resistor being applied by the timer in pulsed on intervals, each on interval followed by an off interval, the heat generated by the resistor during the on intervals applied during said defined cooking period being in the range of 211 to 223 BTU; a heat conductive metal dish containing food on the upper surface of its bottom portion, the under surface of its bottom portion being integrally formed with said resistor, the dish having a heat capacity of 0.5 calories per square inch per degree Centigrade so that a substantial amount of said BTU of heat generated by the resistor during each of said on intervals applied during said cooking period pass through said dish into said food; and a thermally insulated polymeric base member to support and surround said dish and resistor and a thermally insulated polymeric cover disposed over said dish and base to maintain the heat loss from the casserole during said cooking period at a level of about 11 to 23 BTU and further to retard heat transfer from the ambient air surrounding the casserole into the interior of the casserole when the food in the casserole is maintained in stored state and electrical connectors in said insulated base member connecting said film resistor to said timer.

\* \* \* \* \*